United States Patent [19]
Nakagomi et al.

[11] Patent Number: 6,094,322
[45] Date of Patent: *Jul. 25, 2000

[54] APPARATUS FOR AUTOMATICALLY EXCHANGING RECORD MEDIUM CASSETTES BETWEEN A PLURALITY OF RECORDING AND REPRODUCING DEVICES AND BETWEEN CASSETTE STORAGE DEVICES

[75] Inventors: Takashi Nakagomi, Hachiohji; Yoshihisa Ohno, Ohme; Hitoshi Nakamura, Niihari-gun; Tetsuya Yoshioka, Hino; Katsuhiko Tanaka, Namegata-gun, all of Japan

[73] Assignee: Asaca Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,059

[22] Filed: Nov. 26, 1997

[51] Int. Cl.[7] .................................................... G11B 15/68
[52] U.S. Cl. ................................................................ 360/92
[58] Field of Search ................................ 360/92; 369/36, 369/37, 38, 178, 179

[56] References Cited

U.S. PATENT DOCUMENTS

| | | | |
|---|---|---|---|
| 5,293,284 | 3/1994 | Sato et al. | 360/92 |
| 5,303,214 | 4/1994 | Kulakowski et al. | 360/34 |
| 5,429,470 | 7/1995 | Nicol et al. | 360/92 |
| 5,659,434 | 8/1997 | Yamakawa et al. | 360/92 |
| 5,663,938 | 9/1997 | Dang et al. | 369/36 |
| 5,703,843 | 12/1997 | Katsuyama et al. | 369/34 |

FOREIGN PATENT DOCUMENTS

| | | |
|---|---|---|
| 0 407 305 A2 | 1/1991 | European Pat. Off. . |

*Primary Examiner*—David Davis
*Attorney, Agent, or Firm*—Varndell & Varndell, PLLC

[57] ABSTRACT

An apparatus for automatically exchanging a number of record medium cassettes. The apparatus includes a plurality of cassette exchange units 21–24. Each cassette exchange unit has a cassette storing device 32 in which a plurality of record medium cassettes are installed, one or more recording and reproducing devices 33, a cassette transporting device 34 including a cassette hand over mechanism 35 for transporting desired record medium cassettes between the cassette storing devices and the recording and reproducing devices, and a controller 39. The controllers 39 of the cassette exchange units are controlled by a system controller 40 which is connected to a host computer 70 by means of SCSI cables or interface cables 61–69. The recording and reproducing devices 33 are connected in series with the host computer 70. The cassettes can be transported between the cassette exchange units by means of bridging mechanisms 25–27.

7 Claims, 7 Drawing Sheets

APPARATUS FOR AUTOMATICALLY EXCHANGING RECORD MEDIUM CASSETTES BETWEEN A PLURALITY OF RECORDING AND REPRODUCING DEVICES AND BETWEEN CASSETTE STORAGE DEVICES

BACKGROUND OF THE INVENTION

1. Field of the Invention

The present invention relates to an apparatus for automatically exchanging a number of record medium cassettes with respect to a plurality of recording and reproducing devices. Such an apparatus may be advantageously used in a mass storage system of computer and broadcasting equipment. It should be noted that in the present specification, the record medium cassette means a cassette or cartridge of any shape and construction containing any kind of a record medium on and from which any kind of information can be recorded and reproduced.

2. Related Art Statement

A known mass storage system called MSS comprises a plurality of cassette exchange units, each including a cassette storing means for storing a number of record medium cassettes, a recording and reproducing means for recording and reproducing information on and from the record medium cassettes, a cassette transporting means for transporting the record medium cassettes between the cassette storing means and the recording and reproducing means, and a controlling means for controlling said cassette storing means, recording and reproducing means and cassette transporting means, and each of said plurality of cassette exchange units is connected with a host computer by means of an interface cable such as RS-232C cable and SCSI cable.

FIG. 9 is a schematic view showing a known apparatus for automatically exchanging record medium cassettes. In each of four cassette exchange units 1–4, there are provided cassette storing means 5, recording and reproducing means 6, controlling means 7 and cassette transporting means not shown. Each controlling means 7 of the cassette exchange units 1–4 are respectively connected with a host computer 8 by means of interface cables 9–12. The cassette storing means 5, recording and reproducing means 6 and cassette transporting means in respective cassette exchange units 1–4 are controlled by the host computer 8 such that the record medium cassettes are transported between the cassette storing means and the recording and reproducing means to effect the automatic cassette exchange with respect to the recording and reproducing means.

In the known automatic cassette exchange apparatus, the respective cassette exchange units 1–4 are controlled by the host computer 8 separately, and therefore it is rather difficult for the host computer 8 to control a plurality of cassette exchange units in a parallel mode. Particularly, when it is required to add one or more cassette exchange units for increasing a total storage capacity, the parallel control becomes much more complicated and difficult. In other words, the control sequence of the host computer has to be changed to a large extent.

Furthermore, the recording and reproducing means installed in respective one of the cassette exchange units 1–4 could not be used for record medium cassettes installed in another cassette exchange units, and thus when a command from the host computer 8 is concentrated to one cassette exchange unit, a waiting time is prolonged. That is to say, when the recording or reproducing operation for a certain record medium cassette in a certain cassette exchange unit has been finished and another record medium cassette installed in the same cassette exchange unit is required to be set in the recording and reproducing means, the latter cassette could not be transported into the recording and reproducing means until the former cassette has been completely brought back into the cassette storing means. Therefore, there is a rather long waiting time between successive recording or reproducing operations.

The present invention has for its object to provide a novel and useful apparatus for automatically exchanging record medium cassettes, in which the above mentioned problems can be removed by transporting the record medium cassettes among a plurality of cassette exchange units and any desired number of cassette exchange units can be added without difficulty.

According to the invention, an apparatus for automatically exchanging a number of record medium cassettes comprises:

a plurality of cassette exchange units, each including a cassette storing means for storing a plurality of record medium cassettes, a recording and reproducing means for recording and reproducing information on and from record medium cassettes, a first cassette transporting means for transporting the record medium cassettes between the cassette storing means and the recording and reproducing means, and a controlling means for controlling said cassette storing means, recording and reproducing means and first cassette transporting means; and a second cassette transporting means for bridging said plurality of cassette exchange units and transporting the record medium cassettes between said cassette exchange units.

In a preferable embodiment of the automatic cassette exchanging apparatus according to the invention, said plurality of cassette exchange units are controlled by a host computer.

In the automatic cassette exchanging apparatus according to the invention, since a plurality of cassette exchange units each including a number of record medium cassettes are coupled with each other by means of the second cassette transporting means, the record medium cassettes can be freely transported between the exchange units. That is to say, a certain record medium cassette installed in the cassette storing means of a certain cassette exchange unit is transported by the first cassette transporting means into the second transporting means, and then is further transported into another cassette exchange unit by the second transporting means.

DESCRIPTION OF THE PREFERRED EMBODIMENTS

Now the present invention will be explained in detail with reference to FIGS. 1–8.

Figure 1:
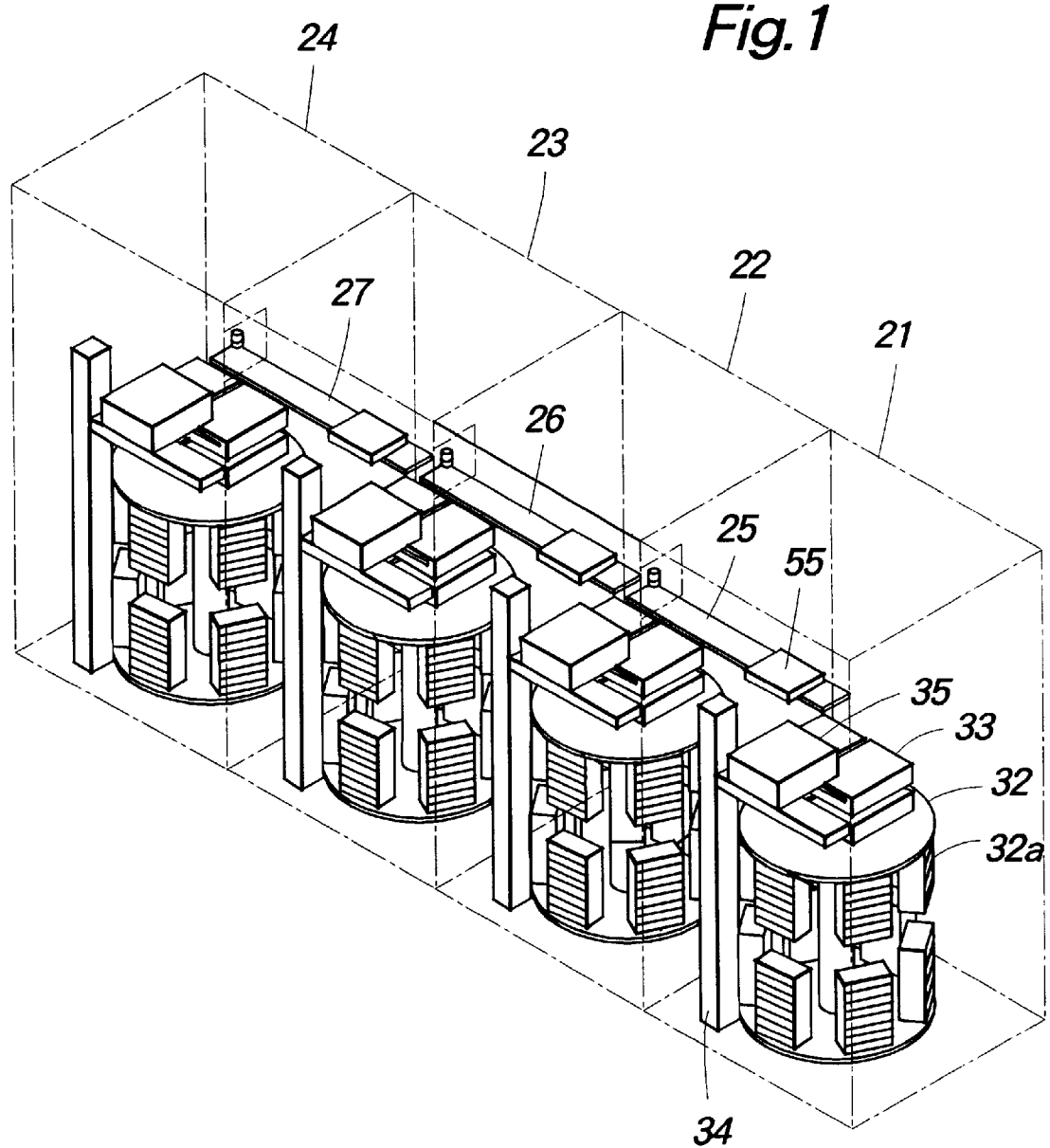
FIG. 1 is a perspective view showing an embodiment of the automatic cassette exchanging apparatus according to the invention.
Figure 2:
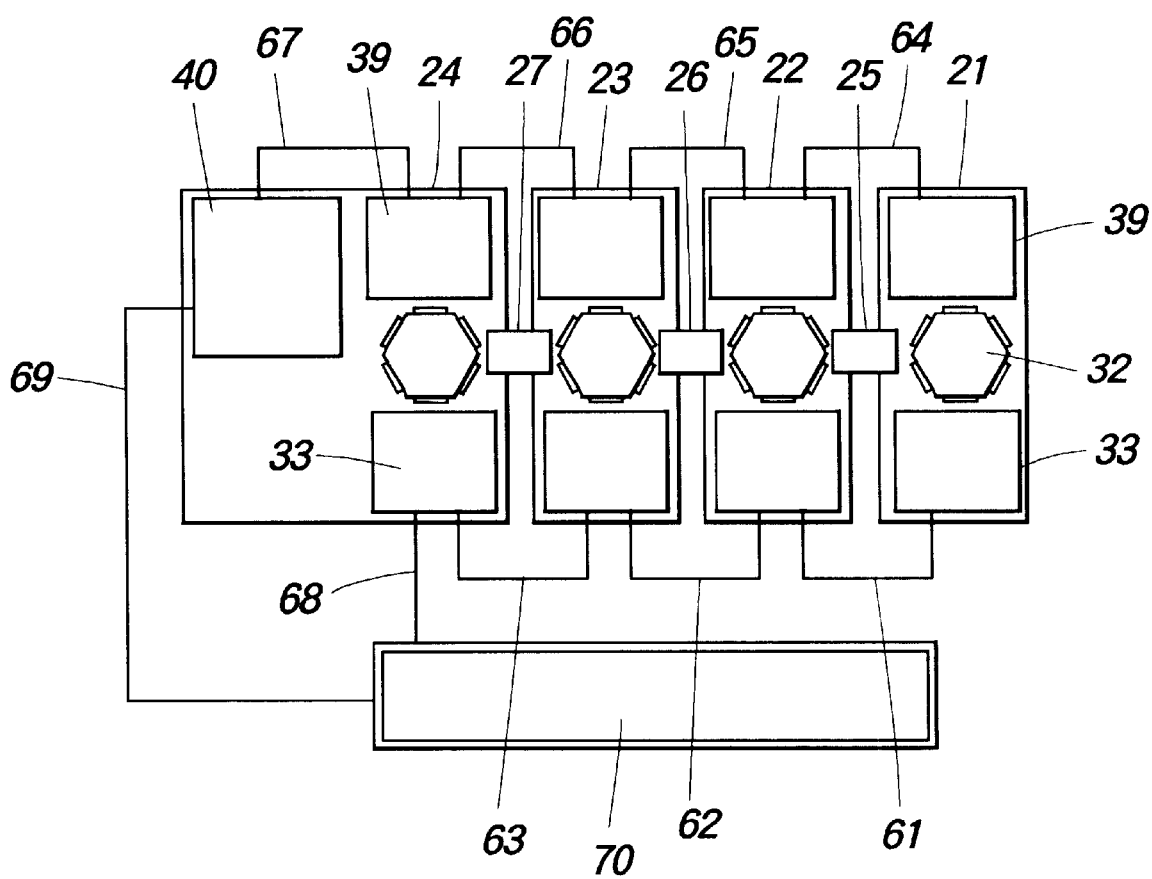
FIG. 2 is a block diagram of the automatic cassette exchanging apparatus shown in FIG. 1.
Figure 3:
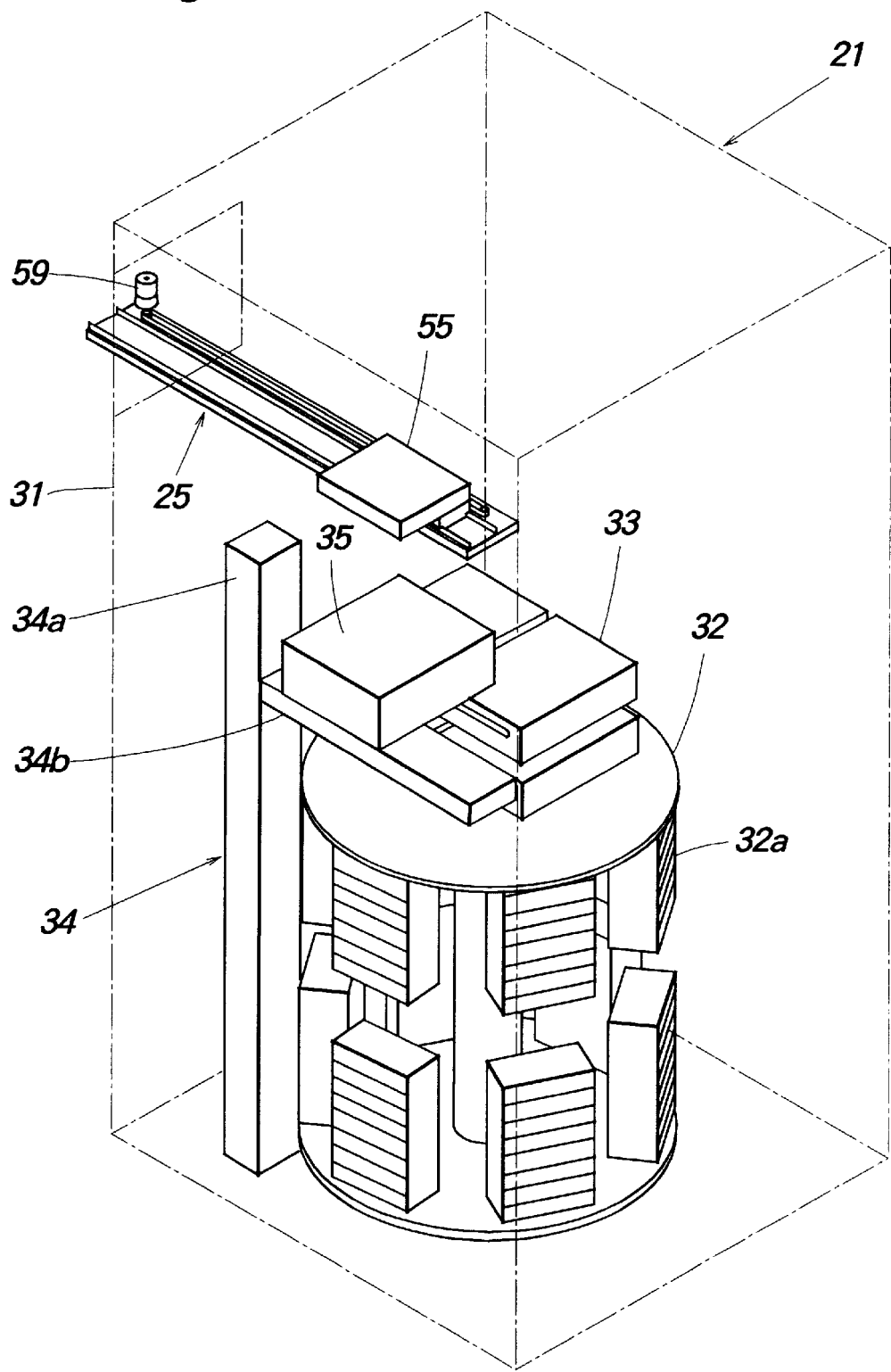
FIG. 3 is a perspective view illustrating a cassette exchange unit.
Figure 4:
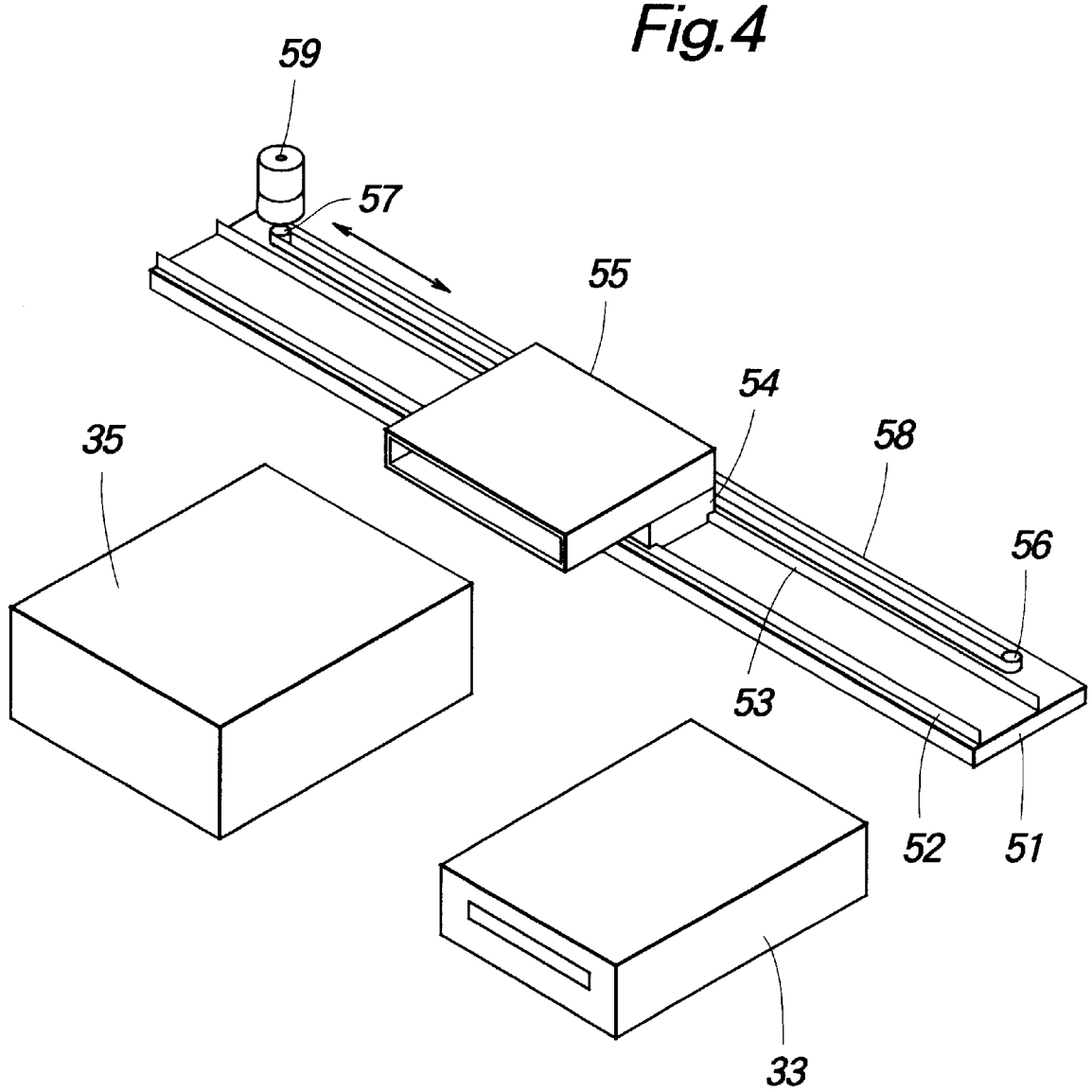
FIG. 4 is a perspective view depicting a bridging mechanism.
Figure 5:
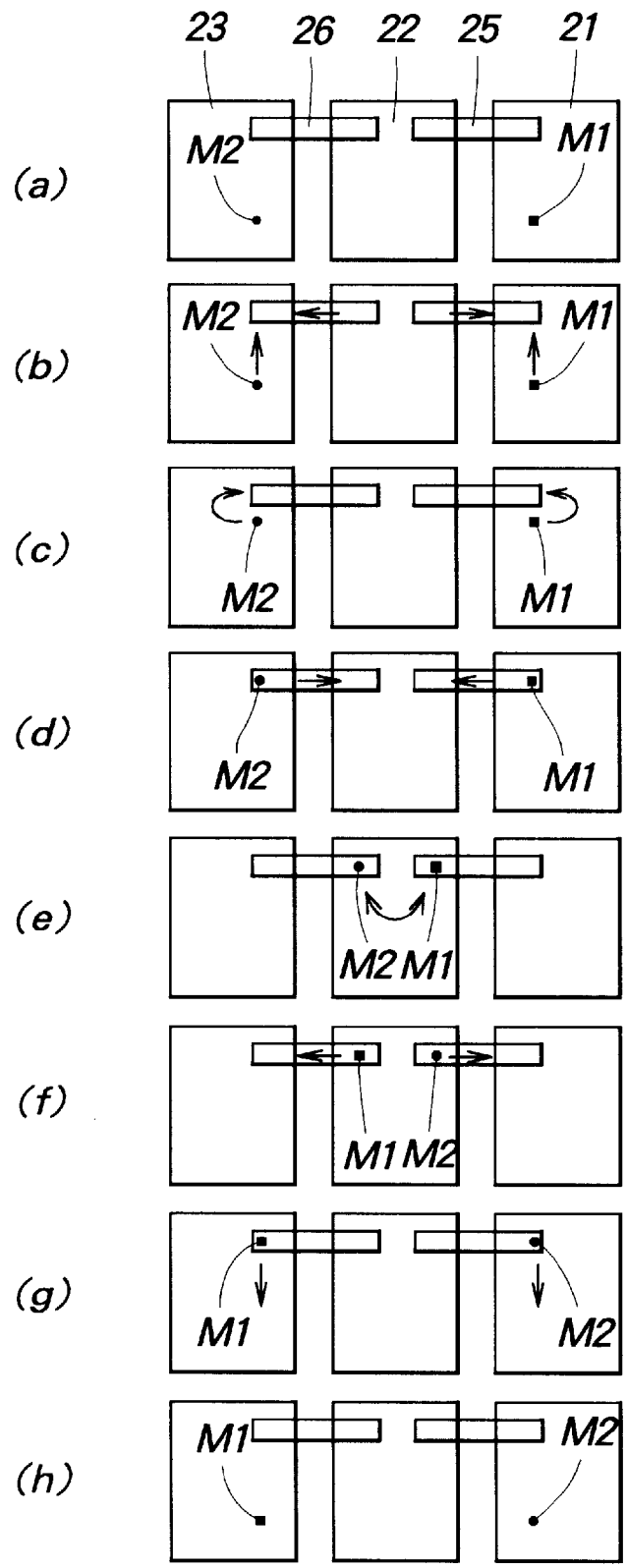
FIGS. 5(a) to 5(h) are schematic views showing successive operations for exchanging cassettes between cassette exchange units.

As shown in a perspective view and schematic plan view of FIGS. 1 and 2, in the present embodiment, the apparatus comprises four cassette exchange units 21–24 which are coupled with each other by means of three bridging mechanisms 25–27. The cassette exchange units 21–24 have the same construction and the cassette exchange unit 21 is formed as illustrated in FIG. 3. The cassette exchange unit 21 comprises a housing 31, a cassette storing device 32 storing a number of record medium cassettes, four recording and reproducing devices 33, each of which can perform the recording and/or reproducing for a cassette installed in a relevant recording and reproducing device, and a first cassette transporting device 34 which transports the cassettes between the cassette storing device 32 and each of the recording and reproducing devices 33.

The cassette storing device 32 includes a rotating member and a number of cassette receiving sections 32a provided in the rotating member. The cassette transporting device 34 includes an upright guide rail 34a, a horizontal guide rail 34b which can move up and down along the upright guide rail 34a, and a cassette hand over mechanism 35 provided on the horizontal guide rail 34b movably along the horizontal guide rail. The cassette hand over mechanism 35 can receive the record medium cassettes and supply the received cassettes with respect to the cassette storing device 32 and recording and reproducing devices 33. Each of the cassette exchange units 21–24 further comprises a controller 39 which controls the cassette storing device 32, recording and reproducing devices 33, cassette transporting device 34 and cassette hand over mechanism 35. In the left hand cassette exchange unit 24, there is provided a system controller 40 which controls all the controllers 39 of the cassette exchange units 21–24.

Each of the bridging mechanisms 25–27 has the same construction. For instance, as shown in an enlarged perspective view of FIG. 4, the bridging mechanism 25 comprises a plate-like base 51, a pair of parallel guide rails 52, 53 provided on the base 51, a slider 54 arranged on the guide rails 52, 53 such that the slider can move reciprocally as shown in a double-headed arrow A along the guide rails 52 and 53, and a carrier 55 provided on the slider 54. As will be explained later, the carrier 55 can receive a cassette from the cassette hand over mechanism 35 and can dispense the received cassette to the cassette hand over device 35.

The slider 54 is coupled with an endless belt 58 provided between rollers 56 and 57 and the roller 57 is coupled with a driving motor 59. The driving motor 59 is controlled by the system controller 40, the driving forth of the motor is transmitted to the slider 54 by means of the belt 58 and the slider and carrier 55 are moved in the reciprocal manner as illustrated by the arrow A.

All the recording and reproducing devices 33 are connected in series with each other by means of cables 61–63, and all the controllers 39 are connected in series with each other by means of cables 64–66. The controller 39 in the cassette exchange unit 24 is connected to the system controller 40 by means of a cable 67. The recording and reproducing devices 33 in the cassette exchange unit 24 and the system controller 40 are connected to a host computer 70 by means of cables 68 and 69, respectively. The cables 61–63, 68 and 69 may be interface cables of SCSI, and the cables 64–67 may be serial interface cables using the multi-drop protocol. In this manner, the bridging mechanisms 25–27, cassette storing devices 32, recording and reproducing devices 33, cassette transporting devices 34, cassette hand over mechanisms 35 and controllers 39 and 40 are controlled by the host computer 70 in a parallel mode by means of a series of addresses.

When a certain cassette installed in one of the cassette exchange units 21–24 is to be transported into one of the recording and reproducing devices 33 provided in the same cassette exchange unit, the cassette transporting device 34 of the relevant cassette exchange unit is operated by a command of the host computer 70 and the cassette hand over mechanism 35 of this cassette transporting device is moved into a predetermined cassette hand over position. Then, the rotating member of the cassette storing device 32 is rotated such that a cassette storing room 32a having the relevant cassette installed therein is indexed to the cassette hand over position. Then, the cassette installed in the cassette storing room 32a is taken into the cassette hand over mechanism 35. To this end, the cassette hand over mechanism 35 includes arm-like members for taking the cassette into the cassette hand over mechanism and dispensing the received cassette. Such arm like-member s and a driving mechanism therefore have been well known in the art, and therefore are not shown in the drawings. Then, the cassette hand over device 35 having the desired cassette is moved upward into a position opposing to the carrier 55 of the relevant cassette exchange unit, and then the cassette is supplied into the carrier.

When two cassettes are to be exchanged between the cassette exchange units 21–23, a series of operations shown in FIGS. 5(a) to 5(h) are carried out successively.

FIG. 5(a) depicts a condition in which a first record medium cassette M1 is installed in a cassette storing room 32a of the right hand cassette exchange unit 21 and a second record medium cassette M2 is stored in a cassette storing room 32a of the left hand cassette exchange unit 23.

Then, as illustrated in FIG. 5(b), the first and second cassettes M1 and M2 are fed from the cassette storing rooms 32a of the cassette storing devices of the respective cassette exchange units 21 and 23 into the cassette hand over mechanisms 35 of the first and second bridging mechanisms 25 and 26, respectively by means of the cassette transporting devices 34 of respective cassette exchange units 21 and 23. Then, the first and second cassettes M1 and M2 installed in the cassette hand over mechanisms 35 are inserted into the carriers 55 of the first and second bridging mechanisms 25 and 26, respectively as shown in FIG. 5(c). At this time, the cassette hand over mechanism 35 of the cassette exchange unit 22 is positioned into a level of the bridging mechanisms 25 and 26.

Next, as shown in FIG. 5(d), the carriers 55 of the first and second bridging mechanisms 25 and 26 are simultaneously moved horizontally out of the cassette exchange units 21 and 23 into the cassette exchange unit 22. It should be noted that the housing 31 of the cassette exchange unit has an opening formed therein and the guide rails 52 and 53 are extended out of the housing through said opening.

As depicted in FIG. 5(e), the first and second cassettes M1 and M2 are exchanged by using the cassette hand over mechanism 35 of the cassette exchange unit 22. This operation is carried out in the following manner. At first, the first cassette M1 is taken out of the carrier 55 of the first bridging mechanism 25 of the cassette exchange unit 21 into the cassette hand over mechanism 35 of the cassette exchange unit 22 and the second cassette M2 is also taken out of the carrier 55 of the exchange unit 23 into the cassette hand over mechanism 35 of the cassette exchange unit 22. To this end, the cassette hand over mechanism 35 is constructed such that at least two cassettes can be installed therein. Then, the second cassette M2 is first fed into the carrier 55 of the first bridging mechanism 25, and finally the first cassette M1 is fed into the carrier 55 of the second bridging mechanism 26.

Then, as illustrated in FIG. 5(f), the carriers 55 of the first and second bridging mechanisms 25 and 26 are simultaneously moved in opposite directions to transport the first and second cassettes M1 and M2 into the cassette exchange units 23 and 21, respectively.

Next, the cassettes M2 and M3 are transferred from the carriers 55 of the first and second bridging mechanisms 25 and 26 into the cassette hand over mechanisms 35 of the cassette exchange units 21 and 23, and then are transported into the cassette storing devices 32 as shown in FIG. 5(g).

Finally, the cassettes M2 and M1 are stored into given cassette storing rooms 32a of the cassette storing devices 32 of the cassette exchange units 21 and 23, respectively as illustrated in FIG. 5(h). In this manner, the cassettes M3 and M2 have been exchanged between the cassette exchange units 21 and 23.

Figure 6:
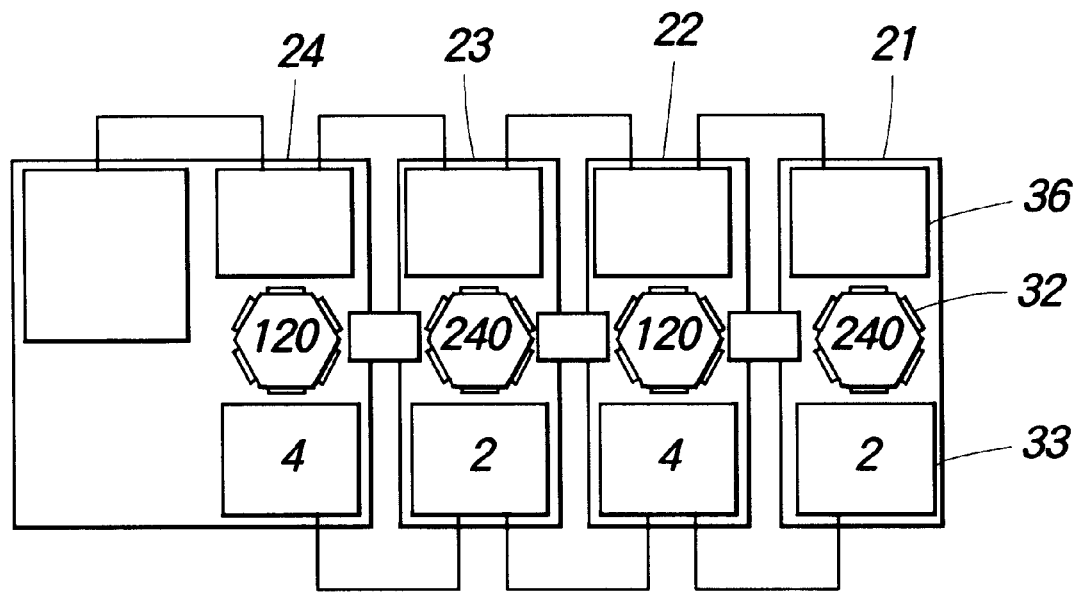
FIG. 6 is a schematic view representing the number of the record medium cassettes and the number of recording and reproducing mechanisms.
Figure 7:
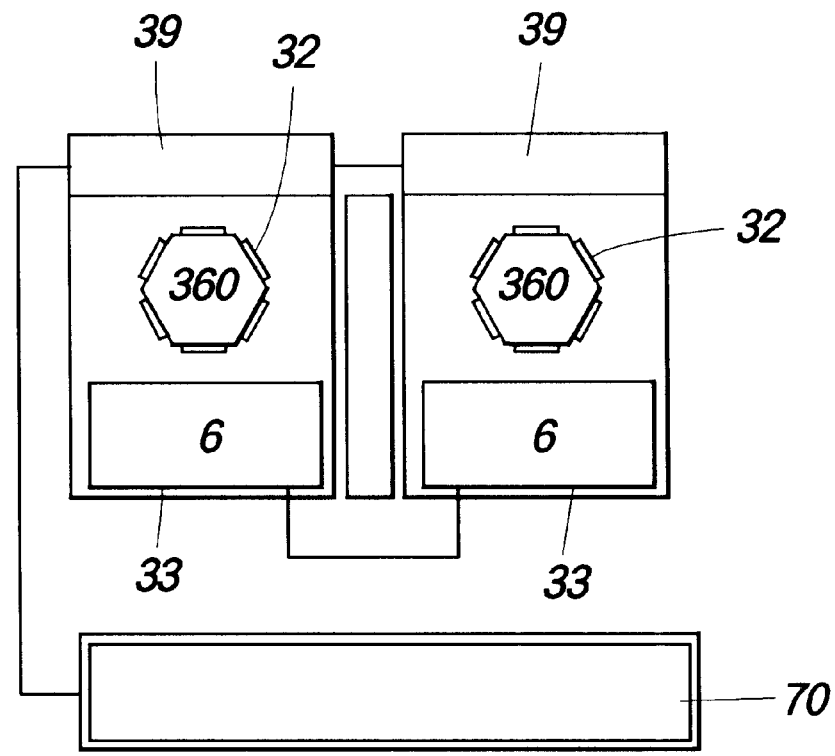
FIG. 7 is a schematic view, in which the number of the cassette exchange units is assumed to be two.
Figure 8:
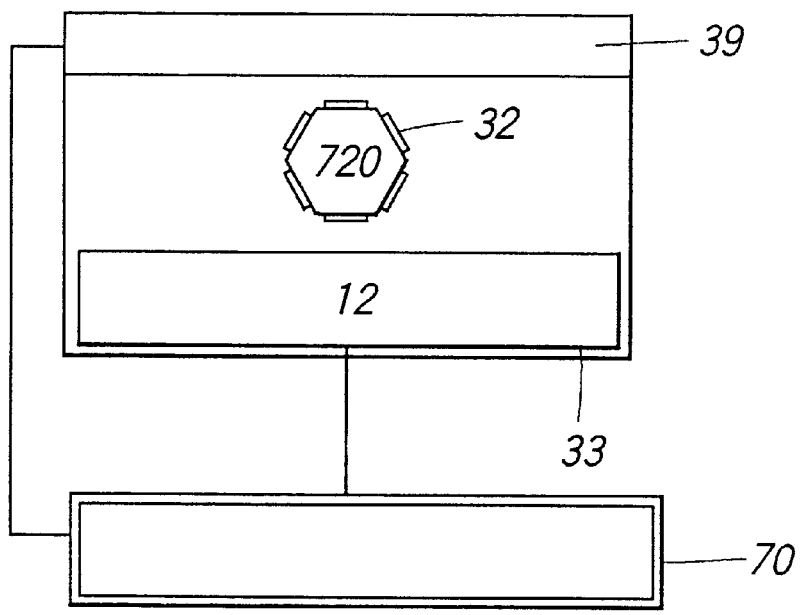
FIG. 8 is a schematic view, in which the number of the cassette exchange units is assumed to be one.
Figure 9:
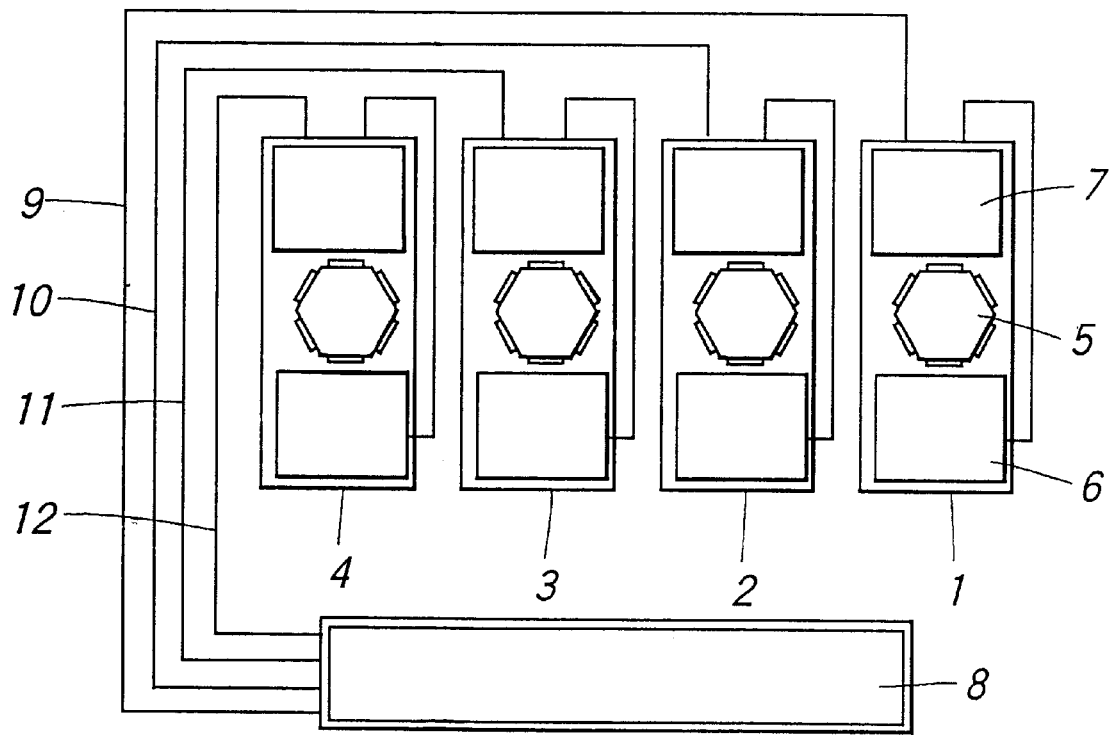
FIG. 9 is a schematic view illustrating a known automatic cassette exchanging apparatus.

As explained above, in the present embodiment, the cassette exchange units 21–24 are coupled in series with each other by means of the bridging mechanisms 25–27 and the cassette exchange units 21–24 are controlled by the host computer 70 in a parallel manner. Therefore, as illustrated in FIG. 6, the cassette exchange unit 21 may comprise 240 cassettes and two recording and reproducing devices, the cassette exchange unit 22 may include 120 cassettes and four recording and reproducing devices, the cassette exchange unit 23 may comprise 240 cassettes and two recording and reproducing devices, and the cassette exchange unit 24 may contain 120 cassettes and four recording and reproducing devices. Then the whole apparatus may be assumed to include two cassette exchange units each comprising 360 cassettes and six recording and reproducing devices as shown in FIG. 7. Alternatively, the whole apparatus may be assumed to comprise 720 cassettes and twelve recording and reproducing devices as depicted in FIG. 8.

In the present embodiment, even if commands for the exchange of cassettes are successively directed to one of the cassette exchange units 21–24, these commands can be dispersed among a plurality of cassette exchange units by exchanging cassettes among these cassette exchange units, and therefore a waiting time can be reduced. Moreover, when it is required to increase the capacity of the cassette storage and/or increase the number of recording and reproducing devices, one or more cassette exchange units and one or more bridging mechanisms are added and are connected to the controller 40 as well as to the host computer 70 by means of cables similar to the cables 61–66.

As explained above, in the record medium cassette automatic exchanging apparatus according to the invention, a plurality of cassette exchange units are coupled with each other by means of the bridging mechanisms, and thus any cassette in one cassette exchange unit can be transported into another cassette exchange units. Therefore, the commands of the host computer can be dispersed among the cassette exchange units, and a waiting time for executing the commands of the host computer can be shortened. Further, by simply adding one or more cassette exchange units and one or more bridging mechanisms, the number of the cassette storing devices and the number of the recording and reproducing devices can be increased.

What is claimed is:

1. An apparatus for automatically exchanging a number of record medium cassettes comprising:
   a plurality of cassette exchange units, each of the cassette exchange units including:
   a cassette storing means for storing a plurality of record medium cassettes,
   a recording and reproducing means for recording and reproducing information on and from said plurality of record medium cassettes,
   a first cassette transporting means for transporting the record medium cassettes vertically and horizontally between the cassette storing means and the recording and reproducing means, said first cassette transporting means including a cassette hand over mechanism which is moved vertically as well as horizontally in a reciprocal manner and which can hold at least one of said plurality of record medium cassettes, said cassette hand over mechanism includes structure for holding at least two of said plurality of record medium cassettes simultaneously and dispensing the at least two cassettes of said plurality of record medium cassettes one by one;
   a second cassette transporting means provided between said plurality of cassette exchange units for transporting record medium cassettes between said cassette exchange units, said second cassette transporting means having one end arranged within a housing of a first exchange unit and a second end arranged within a housing of a second exchange unit which is adjacent the first exchange unit; and
   a controlling means for controlling said cassette storing means, said recording and reproducing means and said first and second cassette transporting means.

2. An apparatus according to claim 1, wherein said controlling means of the cassette exchange units are connected to each other, said recording and reproducing means of the cassette exchange units are connected to each other, and a series arrangement of the controlling means and a series arrangement of the recording and reproducing means are connected to a host computer.

3. An apparatus according to claim 1, wherein said second cassette transporting means comprises a carrier holding one of said plurality of record medium cassettes therein and a driving mechanism for moving said carrier between adjacent said cassette exchange units.

4. An apparatus according to claim 1, wherein said second cassette transporting means comprises a carrier holding one of said plurality of record medium cassettes therein and a driving mechanism for moving said carrier between adjacent said cassette exchange units.

5. An apparatus for automatically exchanging a number of record medium cassettes comprising:
   a plurality of cassette exchange units, each of the cassette exchange units including:
   a cassette storing means for storing a plurality of record medium cassettes at cassette holding positions;
   a recording and reproducing means for recording and reproducing information on and from said plurality of record medium cassettes;
   a cassette hand over mechanism being movable vertically and horizontally between said respective cassette holding positions on the cassette storing means and the recording and reproducing means and being indexed at a cassette hand over position, said cassette hand over mechanism being able to contain simultaneously at least two record medium cassettes selected from said plurality of record medium cassettes and dispense said at least two record medium cassettes one by one;

a bridging mechanism extending horizontally and having a first end arranged within a housing of the relevant cassette exchange unit and a second end arranged within a housing of an adjacent cassette exchange unit; and a carrier which can contain a record medium cassette received at said first end of the bridging mechanism from said cassette hand over mechanism indexed at said cassette hand over position and is movable along said bridging mechanism such that the record medium cassette contained in the carrier can be transported into a cassette hand over mechanism of the adjacent cassette exchange unit at said second end of the bridging mechanism.

6. An apparatus for automatically exchanging a number of record medium cassettes comprising:

a plurality of cassette exchange units, each of the cassette exchange units including:

a cassette storing means for storing a plurality of record medium cassettes at cassette holding positions;

a recording and reproducing means for recording and reproducing information on and from said plurality of record medium cassettes;

a cassette hand over mechanism being movable vertically, and horizontally between said respective cassette holding positions on the cassette storing means and the recording and reproducing means and being indexed at a cassette hand over position, said cassette hand over mechanism being able to contain simultaneously at least two record medium cassettes selected from said plurality of record medium cassettes and dispense said at least two record medium cassettes one by one;

a bridging mechanism extending horizontally and having a first end arranged within a housing of the relevant cassette exchange unit and a second end arranged within a housing of an adjacent cassette exchange unit;

a carrier which can contain a record medium cassette received at said first end of the bridging mechanism from said cassette hand over mechanism indexed at said cassette hand over position and is moveable along said bridging mechanism such that the record medium cassette contained in the carrier can be transported into a cassette hand over mechanism of the adjacent cassette exchange unit at said second end of the bridging mechanism; and a controller for controlling said cassette storing means, said cassette hand over mechanism, said bridging mechanism and said carrier;

wherein the controllers of said plurality of cassette exchange units are connected in series, the series arrangement of the controllers is connected to a host computer such that said plurality of cassette exchange units can be seen as a single library, which is controlled by the host computer in a parallel manner by means of a series of addresses.

7. An apparatus according to claim 6, wherein the recording and reproducing means provided in said plurality of cassette exchange units are connected in series and a series arrangement of recording and reproducing means is connected to said host computer.

* * * * *